US012764397B2

(12) United States Patent
Yavin et al.

(10) Patent No.: US 12,764,397 B2
(45) Date of Patent: Oct. 13, 2026

(54) MULTISPECTRAL STEP-AND-STARE IMAGING WITH SINGLE SENSOR

(71) Applicant: RAFAEL ADVANCED DEFENSE SYSTEMS LTD., Haifa (IL)

(72) Inventors: Zvi Yavin, Gilon (IL); Eliyahu Minkov, Haifa (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 309 days.

(21) Appl. No.: 18/709,864

(22) PCT Filed: Feb. 27, 2023

(86) PCT No.: PCT/IL2023/050204
§ 371 (c)(1),
(2) Date: May 14, 2024

(87) PCT Pub. No.: WO2023/166502
PCT Pub. Date: Sep. 7, 2023

(65) Prior Publication Data

US 2025/0203180 A1 Jun. 19, 2025

(30) Foreign Application Priority Data

Mar. 1, 2022 (IL) .......................................... 291039

(51) Int. Cl.
*H04N 23/11* (2023.01)
*H04N 23/12* (2023.01)
(Continued)

(52) U.S. Cl.
CPC ............. *H04N 23/11* (2023.01); *H04N 23/12* (2023.01); *H04N 23/55* (2023.01); *H04N 23/695* (2023.01)

(58) Field of Classification Search
CPC .... B64U 2101/30; G01J 3/021; G01J 3/0289; G01J 3/06; G01J 3/28; G01J 3/2803;
(Continued)

(56) References Cited

U.S. PATENT DOCUMENTS 7,417,210 B2 8/2008 Ax, Jr. et al.
8,487,996 B2 7/2013 Mann et al.
(Continued)

FOREIGN PATENT DOCUMENTS

CN 107192451 A 9/2017
CN 109164057 A 1/2019
(Continued)

OTHER PUBLICATIONS

Lavigne, Valerie, and Benoit Ricard. "Step-Stare Image Gathering for High-Resolution Targeting," Defence Research and Development Canada Valcartier (Quebec), 2005, 14 pages, available at https://apps.dtic.mil/sti/pdls/ADA472001.pdf.
(Continued)

*Primary Examiner* — Kathleen M Walsh
(74) *Attorney, Agent, or Firm* — The Roy Gross Law Firm, LLC; Roy D. Gross

(57) ABSTRACT

A multispectral image capture device includes an imaging platform having arranged thereon an image sensor comprising a photosensitive surface and an optical unit, a gimbals system for controlling a line of sight of the image sensor, a filter wheel comprising a series of n spectral filters arranged between the image sensor and an imaging target; and a drive system configured to rotate the filter wheel at a constant velocity so as to bring each of the spectral filters into a line of sight between the image sensor and the imaging target. A controller is adapted to synchronize movement of the imaging platform, control of line of sight of the image sensor with the gimbals, and constant rotation of the filter wheel, such
(Continued)

that the image sensor captures a sequence of overlapping step-and-stare images through the series of rotating spectral filters without changing a speed of rotation of the filter wheel.

17 Claims, 5 Drawing Sheets

(51) Int. Cl.
*H04N 23/55* (2023.01)
*H04N 23/695* (2023.01)

(58) Field of Classification Search
CPC ......... G01J 3/32; G03B 15/006; G03B 33/08; G03B 37/02; G06V 10/143; G06V 10/16; G06V 20/17; H04N 23/11; H04N 23/12; H04N 23/125; H04N 23/55; H04N 23/695
USPC .......................................................... 348/164
See application file for complete search history.

(56) References Cited

U.S. PATENT DOCUMENTS

| | | | | |
|---|---|---|---|---|
| 9,374,540 | B1 * | 6/2016 | Sacco | H04N 25/71 |
| 9,442,012 | B2 | 9/2016 | Mann et al. | |
| 9,961,308 | B2 | 5/2018 | Georgy | |
| 2005/0177307 | A1 * | 8/2005 | Greenfeld | G01C 11/025 701/6 |
| 2008/0001066 | A1 * | 1/2008 | Ax | G01J 3/513 250/208.1 |
| 2012/0075470 | A1 * | 3/2012 | Huang | H04N 23/55 348/E7.085 |
| 2016/0006954 | A1 | 1/2016 | Robertson | |
| 2016/0255253 | A1 | 9/2016 | Kelchner et al. | |
| 2017/0118449 | A1 * | 4/2017 | Tillotson | G01J 3/00 |
| 2017/0180684 | A1 * | 6/2017 | Georgy | H04N 23/80 |
| 2020/0019039 | A1 * | 1/2020 | Hong | G03B 33/00 |
| 2022/0141428 | A1 * | 5/2022 | Hruska | G01J 3/2803 348/263 |
| 2022/0264014 | A1 * | 8/2022 | Robinson | H04N 23/6811 |

FOREIGN PATENT DOCUMENTS

| | | | | | |
|---|---|---|---|---|---|
| KR | 101218768 | B1 | | 1/2013 | |
| WO | WO-2009154786 | A1 | * | 12/2009 | G01N 21/3563 |

OTHER PUBLICATIONS

Faure, F., Coste, P., & Kang, G. "The GOCI Instrument on COMS Mission—The First Geostationary Ocean Color Imager," In Proceedings of the International Conference on Space Optics (ICSO) (vol. 6, pp. 1-6) (2008), available at https://www.ioccg.org/sensors/GOCI-Faure.pdf.

Faure, François, et al. "One Year in Orbit of the First Geostationary Ocean Colour Imager (GOCI)," International Conference on Space Optics—ICSO 2012. vol. 10564. SPIE, 2017, 9 pages, available at https://www.spiedigitallibrary.org/conference-proceedings-of-spie/10564/1056409/One-year-in-orbit-of-the-first-Geostationary-Ocean-Colour/10.1117/12.2309181.pdf.

Chang et al., "Battlefield Dynamic Scanning and Staring Imaging System based on Fast Steering Mirror," Journal of Systems Engineering and Electronics, 30:1, 37-56 (Feb. 2019), available at https://ieeexplore.ieee.org/iel7/5971804/8660534/08660542.pdf.

Xiu et al., "Line of Sight and Image Motion Compensation for Step and Stare Imaging System," Appl. Sci. 2020, 10, 7119, 14 pages, doi: 10.3390/app10207119.

Fu et al., "Non-Rotationally Symmetric Field mapping for Back-Scanned Step/Stare Imaging System," Appl. Sci. 2020, 10, 2399, 14 pages, doi:10.3390/app10072399.

Aghamaleki et al., Infrared and Visible Image Fusion based on Optimal Segmenting and Contour Extraction, SN Applied Sciences 3:369 (2021), 14 pages, https://doi.org/10.1007/s42452-020-04050-w.

Wang, Lin; Liu, Xuelian; Wang, Chunyang, "Modeling and Design of Fast Steering Mirror in Image Motion Compensation for Backscanning Step and Stare Imaging Systems," Optical. Oct. 18, 2019, 11 pages.

PCT International Search Report and Written Opinion, PCT Application No. PCT/IL2023/050204, Jun. 13, 2023, 7 pages.

* cited by examiner

Prior Art

MULTISPECTRAL STEP-AND-STARE IMAGING WITH SINGLE SENSOR

RELATED APPLICATIONS

The present Application claims priority to Israel Patent Application No. 290139, filed Mar. 1, 2022, entitled "Multispectral Step-and-Stare Imaging With Single Sensor," the contents of which are incorporated by reference as if fully set forth herein.

FIELD OF THE INVENTION

The present Application relates to an airborne reconnaissance with a focal plane array (FPA), and more specifically, but not exclusively, to a device and method for capturing multispectral images of a target area, at high resolution, with a single sensor.

BACKGROUND OF THE INVENTION

Step-and-stare imaging is a technique for obtaining a composite image of a large geographical area. An imaging sensor is mounted on an airborne platform, such as on a drone. As the airborne platform advances along a track, the sensor captures images of a target area. For example, as illustrated schematically in FIG. 1A, airplane 20 flying in a straight line and bearing an image sensor passes each of patches 1-15, whether directly overhead or at an angle, and the image sensor captures an image of each patch. After capture of the images, the frames are recorded or transmitted to a ground station for further processing.

Multispectral step-and-stare imaging refers to the process of capturing images in more than one defined spectral band during a step-and-stare imaging process.

There are various known strategies for multispectral step-and-stare imaging, each suffering from various drawbacks. One approach utilizes multiple cameras mounted on the imager, each configured to scan a particular range of spectral wavelengths. However, multiple cameras take up a large volume, have a high weight, and increase the cost of the imaging. A second approach is to apply a series of filter strips onto a single focal plane array. This approach is typically used for hyperspectral imaging, when it is desired to scan in a large number of spectral bands. However, this approach limits the flexibility of the system. Step-and-stare imaging benefits from the flexibility of controlling where to place the camera for a subsequent image, including repeating images if desired. This flexibility is unavailable in setups with fixed spectral filters.

The step and stare process is typically designed such that neighboring images contain overlapping measurements of the region of interest. The presence of overlapping regions in the output images allows for later image processing to register neighboring image frames and to mosaic the images together to reconstruct a more complete image of the region of interest.

SUMMARY OF THE INVENTION

The present Application discloses a solution for high-speed multispectral scanning using a filter wheel construction, with each filter area covering the entire imaging area, and with an improved technique for synchronization. The filter wheel rotates at constant velocity while the image sensor captures images. Specifically, the rate of capture of images by the image sensor is precisely synchronized with the speed of rotation of the filter wheel. In addition, when the step and stare scanning is assisted by a fast steering mirror for back scanning, the movement of the fast steering mirror is synchronized with the capturing of the images by the image sensor and with the movement of the imaging platform relative to the target. Thus, the image sensor captures a single image for every advancing of a spectral filter, without requiring any change of speed of the filter wheel during the imaging. As a result, the multispectral imager is able to capture images at a high frequency, with a correspondingly high resolution as well. The images are captured with sufficient overlap to enable post-processing combination of the images covering the entire imaged area for each spectral filter.

According to a first aspect, a multispectral image capture device is disclosed. The device includes an imaging platform having arranged thereon an image sensor comprising a photosensitive surface and an optical unit, a gimbals system for controlling a line of sight of the image sensor, a filter wheel comprising a series of n spectral filters arranged between the image sensor and an imaging target; and a drive system configured to rotate the filter wheel at a constant velocity so as to bring each of the spectral filters into a line of sight between the image sensor and the imaging target. A controller is adapted to synchronize movement of the imaging platform, control of the line of sight of the image sensor with the gimbals, and constant rotation of the filter wheel, such that the image sensor captures a sequence of overlapping step-and-stare images through the series of rotating spectral filters without changing a speed of rotation of the filter wheel.

In another implementation according to the first aspect, a percentage of overlap between two adjacent step-and-stare images is at least $100*(n-1)/n$.

In another implementation according to the first aspect, the controller is configured to capture a single image each time a spectral filter passes through a line of sight between the imaging target and the image sensor.

In another implementation according to the first aspect, the filter wheel further comprises at least one additional spectral filter of a smaller dimension than the each of the series of n spectral filters, and the controller is configured to freeze the rotation of the filter wheel when capturing the step-and-stare images via the at least one additional spectral filter. Optionally, the at least one additional filter allows a combination of all spectral bands allowed by the n spectral filters.

In another implementation according to the first aspect, the device further comprises a fast steering mirror, and the controller is configured to advance the spectral filters relative to the image sensor, and to capture step-and-stare images, when using the fast steering mirror for back scanning. The back scanning may be performed in order to freeze the line of sight relative to the ground for each captured frame.

In another implementation according to the first aspect, the image capture rate is at least 30 frames per second.

According to a second aspect, a method of multispectral step-and-stare imaging is disclosed. The method includes: advancing an imaging platform relative to an imaging target, wherein the imaging platform has arranged thereon an image sensor comprising a photosensitive surface, a gimbals system for controlling a line of sight of the image sensor, and a filter wheel comprising a series of n rotating spectral filters and arranged between the image sensor and the imaging target; rotating the filter wheel at a constant velocity so as to bring each of the spectral filters into a line of sight between the image sensor and the imaging target, and synchronizing straight line movement of the platform, image capture rate of the image sensor, control of the line of sight of the image sensor, and rotation of the filter wheel, such that the image sensor captures a sequence of overlapping step-and-stare images through the series of rotating spectral filters without changing a speed of rotation of the filter wheel.

In another implementation according to the second aspect, a percentage of overlap between two adjacent step-and-stare images is at least 100*(n−1)/n.

In another implementation according to the second aspect, the method further includes capturing a single image each time a spectral filter passes through a line of sight between the imaging target and the image sensor.

In another implementation according to the second aspect, the filter wheel further comprises at least one additional spectral filter of a smaller dimension than the each of the series of n spectral filters, and the method further comprises freezing the rotation when capturing the step-and-stare images via the at least one additional spectral filter. Optionally, the at least one additional spectral filter allows a combination of all light allowed by the n rotating spectral filters.

In another implementation according to the second aspect, the spectral filters permit passage of light in the visible and infrared ranges.

In another implementation according to the second aspect, the imaging platform includes a fast steering mirror, and the method further includes advancing the spectral filters relative to the image sensor, capturing step-and-stare images while using the fast steering mirror for back scanning. The back scanning may be used in order to freeze the line of sight relative to the ground for each captured frame.

In another implementation according to the second aspect, the image capture rate is at least 30 frames per second.

In another implementation according to the second aspect, the method further includes stitching images captured through each respective filter, so as to form a photomosaic of the imaging target for each spectral band.

In another implementation according to the second aspect, the method further includes performing exposure fusion on images of the imaging target captured through different spectral bands.

DETAILED DESCRIPTION OF THE INVENTION

Figure 1:
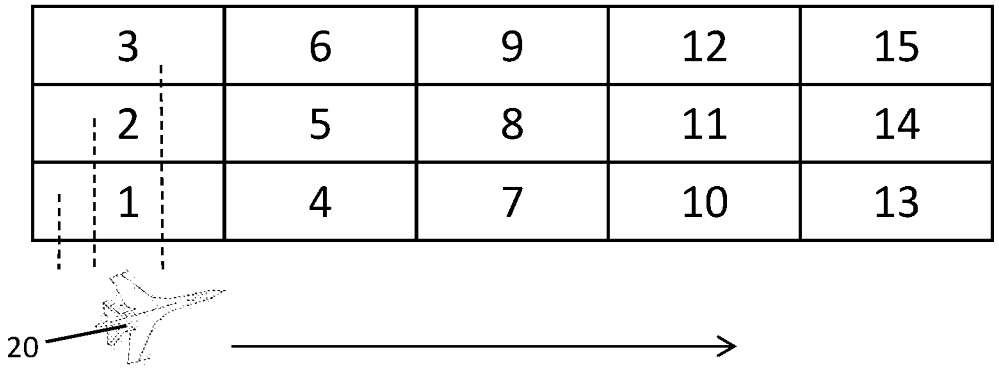
FIG. 1 is an example of a prior art depiction of an airborne scanner performing step-and-stare imaging.

The present Application relates to reconnaissance with a focal plane array (FPA), and more specifically, but not exclusively, to a device and method for capturing multispectral images of a target area, at high resolution, with a single sensor.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 2A:
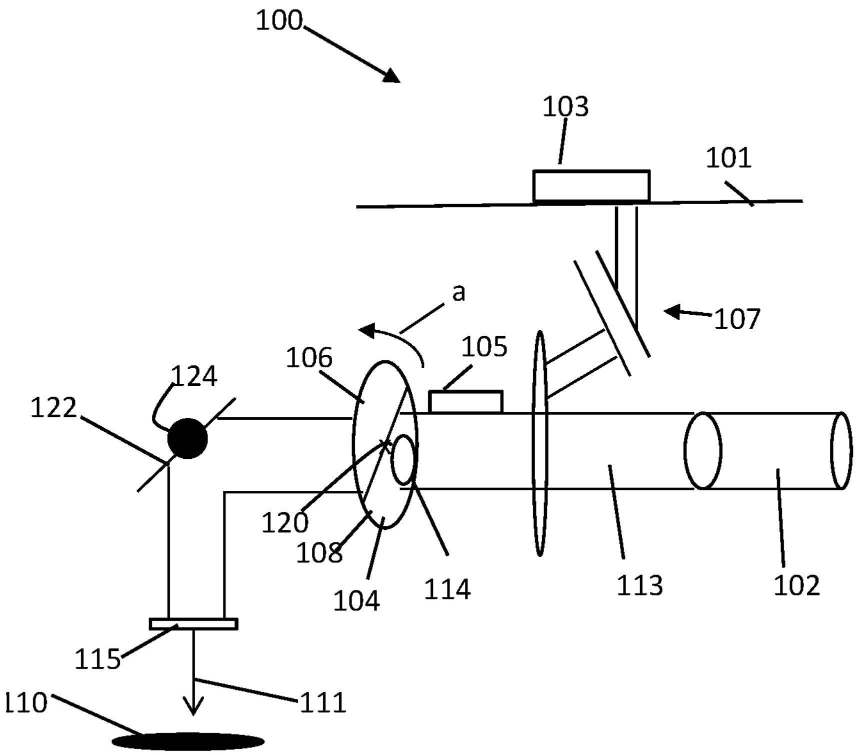
FIG. 2A schematically depicts a system for multispectral step-and-and stare imaging, according to embodiments of the present disclosure.

FIG. 2A schematically depicts a system 100 for multispectral step-and-stare imaging, according to embodiments of the present disclosure. The system 100 is configured to image a ground target 110 while passing the target 110 along a line of sight 111.

Imaging platform 101 serves as a base for other elements of imaging system 100. Imaging platform 101 is mounted on a suitable airborne vehicle, such as an airplane or a drone. A gimbals system 107, represented schematically, is mounted to the imaging platform 101. The gimbals system 107 supports the other components of the imaging system 100. The gimbals system 107 is capable of rotation and fixation around the X, Y, and Z axes. Gimbals system 107 also includes an inertial measuring unit (IMU). Using the IMU and the axes of rotation, the gimbals system 107 is capable of compensating for forward motion and maneuvers of the imaging platform 101, in order to fix the line of sight of the imaging system 100.

Imaging system 100 further includes an image sensor 102. Image sensor 102 has a photosensitive surface, and may be any suitable sensor for capturing images in various spectral bands, such as the visual and infrared ranges. In exemplary embodiments, the image sensor 102 is a focal plane array.

Optionally, optical unit 113 is configured anterior to the image sensor 102. Optical unit 113 contains one or more lenses for focusing light onto the image sensor 102.

Filter wheel 104 is mounted anterior to the image sensor 102. The filter wheel 104 includes a series of n spectral filters, arranged circumferentially around filter wheel 104. In the illustrated embodiment, n equals 2, and there are two filters 106, 108. In a typical scenario, each of the spectral filters is a band-pass filter that permits through only a defined spectral band.

Fast steering mirror 122 is configured between the filter wheel 104 and a light opening 115 of the imaging system 100. The fast steering mirror 122 is mounted on a rotatable axis 124, enabling rotation of the fast steering mirror 122 relative to the opening 115, image sensor 102, and filter wheel 104. Rotation of the fast steering mirror 122 in a back-scanning motion fixates a line of sight of the image sensor 102 to a center of each frame on the ground, when the gimbals 107 are moving the line of sight 111 continuously along a line that connects the centers of the frames in a manner known to those of skill in the art. While it is possible to achieve the same step and stare function with the gimbals 107 alone, the fast steering mirror 122 enables a faster step and stare scanning, and is thus well-suited for capturing images at rates of as high as 30 frames per second, 100 frames per second, or an even faster rate.

Pass-through region 114 is defined on the filter wheel 104. The pass-through region 114 is the region on the filter wheel 104 that is aligned with the image sensor 102, through optical unit 113. Light originating at imaging target 110, traveling along line of sight 111, through opening 115, and through the filter wheel 104 at pass-through region 114, will reach image sensor 102.

The filter wheel 104 is mechanically connected to a drive system 105 (shown schematically), for example, through spinning axis 120. The drive system 105 causes the filter wheel 104 to rotate relative to the image sensor 102. In the illustrated embodiment, the filter wheel is depicted as rotating in a counterclockwise direction, as indicated by the arrow a. As a result of the rotation of the filter wheel, each of the spectral filters 106, 108 is sequentially brought into the pass-through region 114.

Controller 103 is arranged on the imaging platform 101. The controller 103 includes a processor, and a non-transitory computer-readable medium for storing therein instructions that are executable by the processor. Controller 103 controls movement of drive system 105, the gimbal system 107, and the capture of images by the image sensor 102. Specifically, controller 103 synchronizes straight-line movement of the imaging platform 101, motion of the gimbals 107, rotation of the filter wheel 104, and back-scanning of the fast steering mirror 122, when present.

In particular advantageous embodiments, the rate of capture of images by the image sensor 102 is precisely synchronized with the speed of rotation of the filter wheel 104. In addition, the movement of the fast steering mirror 122 is synchronized with the capturing of the images by the image sensor 102 and with the control of the line of sight of the image sensor 102 with the gimbals 107. Thus, the image sensor 102 captures a single image for every advancing of a spectral filter, without requiring any change of speed or slowing down of the filter wheel 104 during the imaging.

For example, filter wheel 104 may rotate at a rate of r revolutions per second. Because there are n filters on the wheel, during each second, filters sequentially reach pass-through region 114 a total of r*n times. The controller 103 causes image sensor 102 to capture a single image each time a spectral filter passes through the pass-through region 114. Thus, when r*n filters cross the pass-through region 114, image sensor 102 correspondingly captures r*n images.

As discussed above, due to the synchronizing of movement of the filter wheel 104, imaging platform 101, and fast steering mirror 122, the filter wheel 104 transitions from filter region to filter region without slowing down its rotation. As a result, system 100 is able to capture images covering an entire target area highly efficiently. For example, the controller 103 may be configured to advance the spectral filters at a rate (i.e., the rate r*n discussed above) exceeding 30 or 100 per second, and correspondingly to capture images at the same frame rate. This high frame rate, in turn, allows for capturing of images at high resolution.

During this entire process, imaging platform 101 is advancing relative to the target 110, typically in a linear fashion, as depicted in FIG. 1. Despite the constant movement of the image sensor 102, the line of sight 111 is nevertheless stabilized through a combination of movement of gimbals 107 with back-scanning of fast steering mirror 122.

Figure 2B:
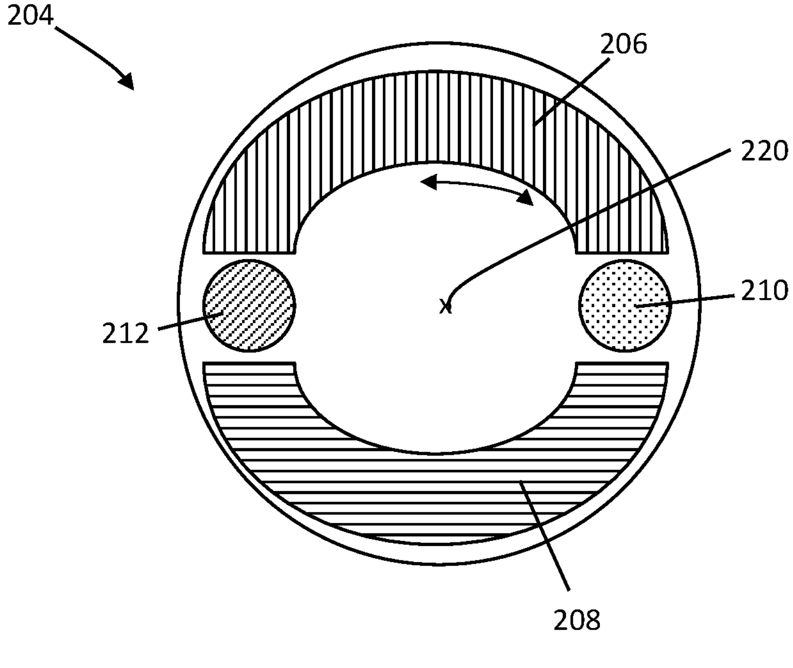
FIG. 2B depicts a filter wheel, according to embodiments of the present disclosure.

FIG. 2B depicts an exemplary embodiment of a filter wheel 204 that is usable with system 100. Filter wheel 204 includes two spectral filters 206, 208, that occupy most of the circumference of the wheel 204, and which are configured to be located in the line of sight of the image sensor during capture of images, as described above in connection with FIG. 2A. Filter wheel 204 also includes a spinning axis 220 around which the filter wheel 204 rotates. Filter wheel 204 differs from filter wheel 104 in that filter wheel 204 also includes one or more additional filters 210, 212. Filters 210, 212 have a smaller dimension than that of filters 206, 208. In exemplary embodiments, filters 210, 212 are the same size as the pass-through region 114 of FIG. 1.

When the system 100 is used in the multispectral imaging mode, with the filter wheel 104 rotating, the controller may be configured to pass over filters 210, 212 during imaging. For example, suppose that the wheel 104 rotates completely every 2/100 of a second. If an image is captured exactly every 1/100 of a second, and the first image is taken with one of filters 206, 208 in the pass-through region, then all subsequent images will also be taken through filters 206 and 208, and none of the subsequent images will be taken through filters 210 and 212.

By contrast, filters 210, 212 (as well as filters 206 and 208) are suitable for filtering light coming toward the image sensor when the filter wheel is in a fixed position. Such filters may be advantageous, both for using the same apparatus 100 for regular (non-multispectral) step-and-stare imaging, or for capturing other frequencies of interest. For example, one of filters 210, 212 may be a panchromatic filter having a pass-through region that a combination of all the spectral bands allowed by the image sensor. Another of the filters 210, 212 may be used for an additional spectral band to those of filters 206, 208.

Figure 3:
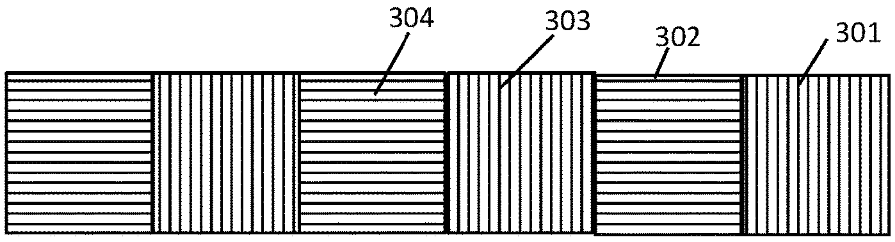
FIG. 3 depicts an exemplary sequence of non-overlapping multispectral images.
Figure 4:
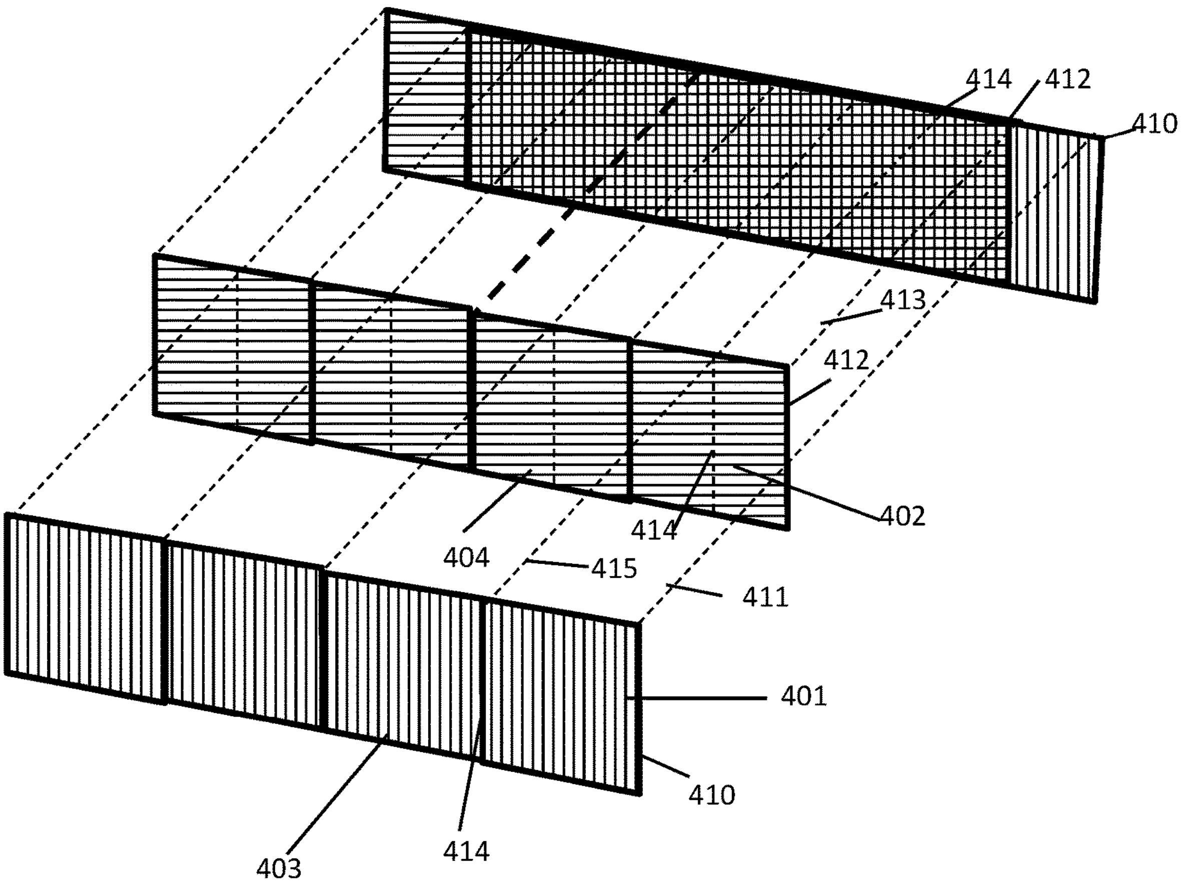
FIG. 4 schematically depicts an exemplary sequence of overlapping multispectral images with two different spectral filters, according to embodiments of the present disclosure.
Figure 5:
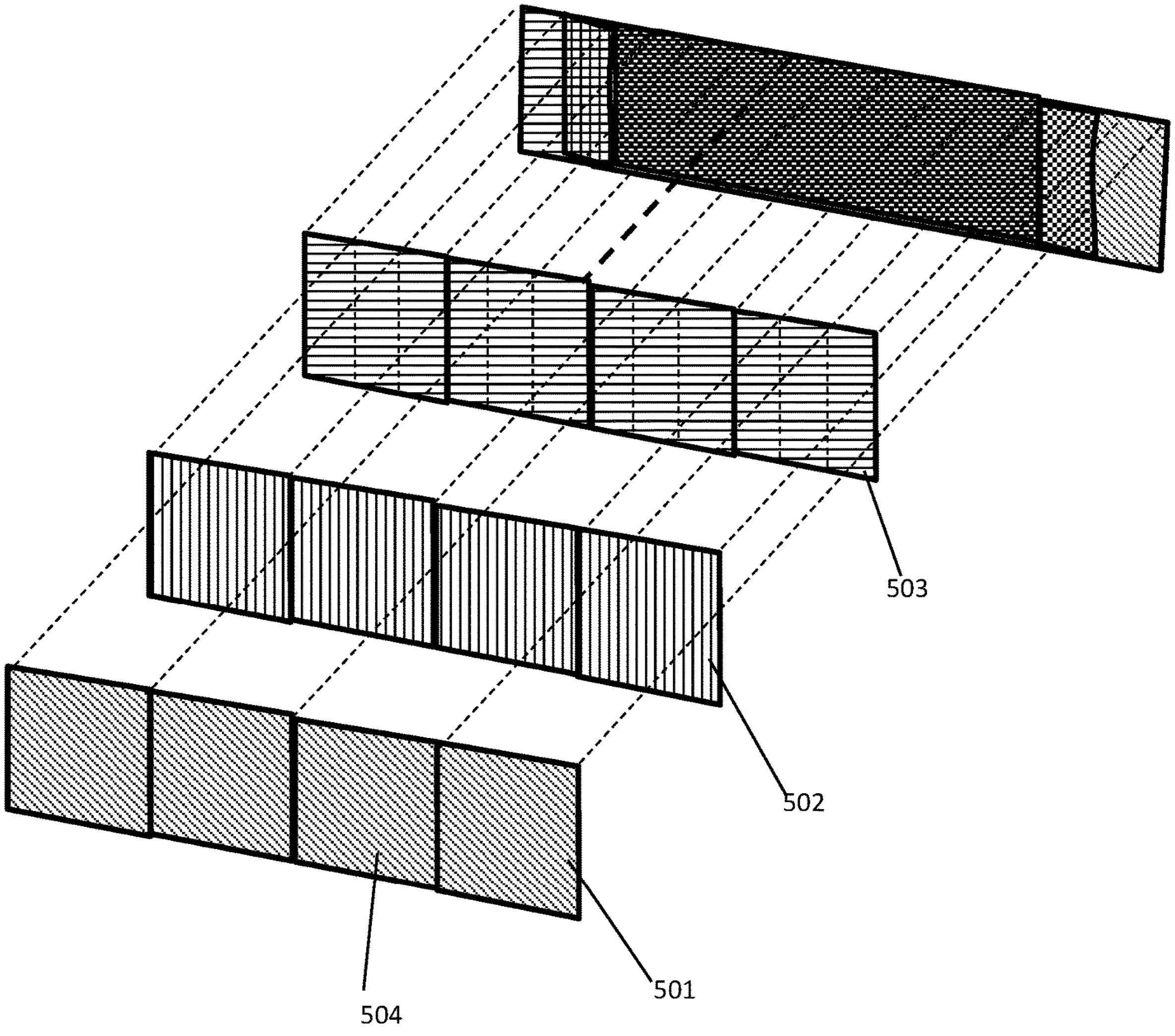
FIG. 5 schematically depicts an exemplary sequence of overlapping multispectral images with three different spectral filters, according to embodiments of the present disclosure.

FIGS. 3-5 illustrate the overlapping of images captured by the image sensor 102 during rotation of the filter wheel 104, 204. FIG. 3 depicts sequential images 301 taken through a first spectral filter, 302 taken through a second spectral filter, 303 taken again through the first spectral filter, and 304 taken again through the second spectral filter, as the imaging line of sight moves from right to left. There is no overlap between the images. As a result, this imaging pattern is not suitable for step-and-stare imaging, because only half of the target region is captured through each spectral filter.

FIG. 4, by contrast, illustrates the effect of overlapping images. Image 401 is captured through a first spectral filter, image 402 is captured through a second spectral filter, image 403 is captured through the first spectral filter, and image 404 is captured through the second spectral filter. Image 402 overlaps image 401 by at least 50%, image 403 overlaps image 402 by at least 50%, and image 404 overlaps image 403 by at least 50%. This overlap is shown with the dashed lines drawn from the boundaries of images taken through a first filter, through the images taken through a second filter, and through the mosaicked final image. For example, line 411 commences at point 410 from the images captured through the first filter, and reaches point 410 of the combined images. Line 413 commences at point 412 from the images captured through the second filter. Line 415 commences from the boundary point 414 between images 401 and 403 from the first filter, which is the same as the midpoint of image 402 from the second filter. The pattern repeats throughout the entire length of the imaged target region. As a result, a mosaicked image is formed covering the entire line, for both spectral filters.

FIG. 5 illustrates a similar arrangement of overlapping images for a scenario in which there are three spectral filters. Image 501 is captured through a first spectral filter, image 502 is captured through a second spectral filter, and image 503 is captured through a third spectral filter. Image 504 is captured through the first spectral filter again, and so the pattern repeats. Each image overlaps an adjacent image by at least 67%. As a result, mosaicked images may be formed covering the entire line, for each spectral filter.

The degree of necessary overlap between adjacent images, for a filter wheel with n spectral regions, is governed by the following equation:

$$\text{Over Lap }\% = 100\cdot\left\{\frac{N-1}{N}\right\}$$

Thus, for n=2, the overlap region must be at least 50%; for n=3, the overlap region must be at least 67%; and for n=4, the overlap region must be at least 75%. The overlap percentage converges to 100% as the number of filter regions n increases.

In view of the foregoing, there is a tradeoff between the number of filter regions n included in a filter wheel and the area coverage rate. By way of example, when n=2 the overlap between frames will be 50% and the coverage rate will decrease to 50% of a coverage with a single spectral band. When n=3, the overlap between frames will be 67% and the coverage rate will decrease to 33% of a coverage with a single spectral band.

In most applications, a value of n from between 2 and 4 enables capturing of images with a desired coverage rate.

Figure 6:
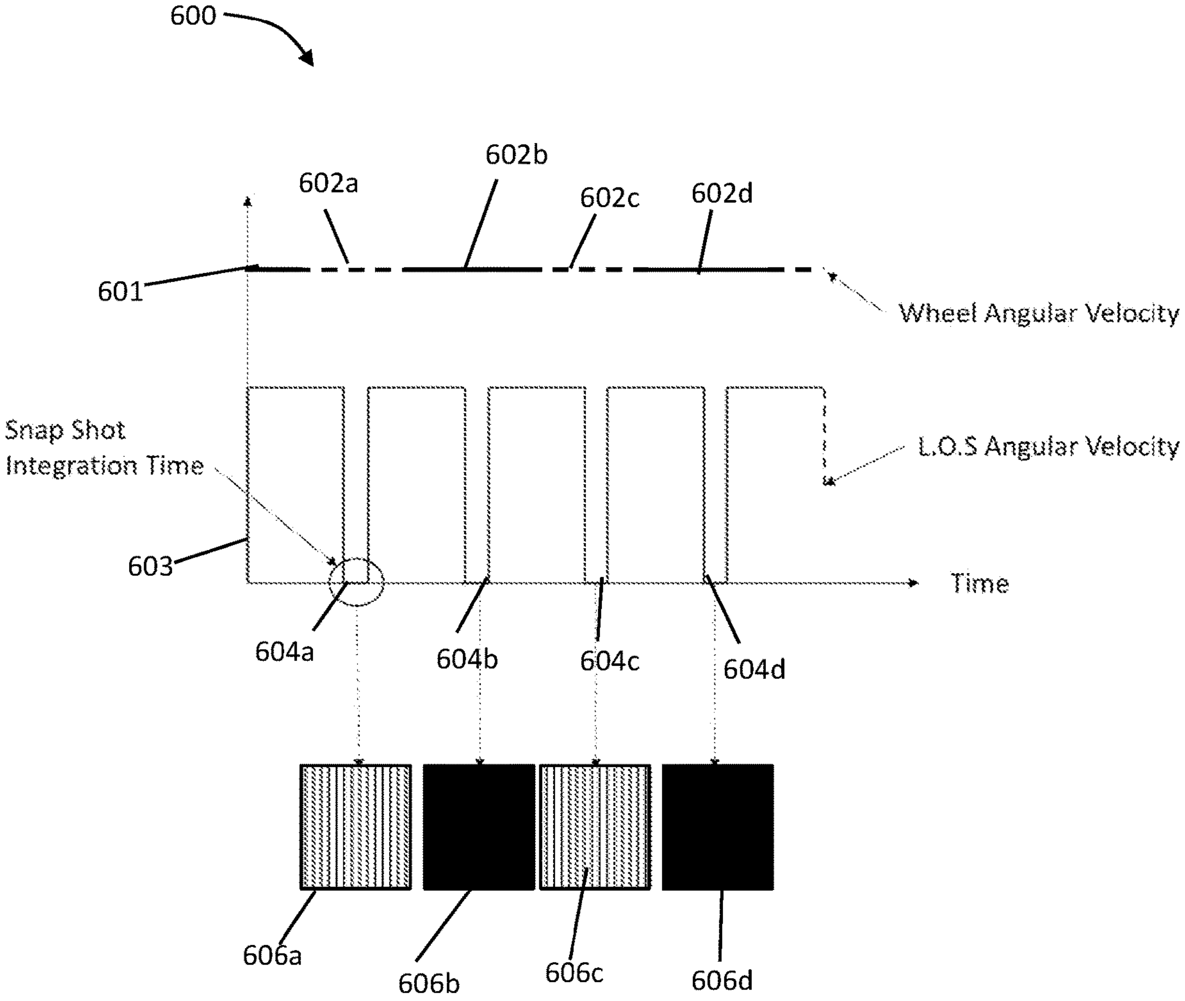
FIG. 6 illustrates coordination of timing of capturing of images with the image sensor and rotation of the filter wheel, according to embodiments of the present disclosure.

FIG. 6 depicts a graph 600 that illustrates the synchronizing of the angular revolutions of the filter wheel with the capturing of the images. In the illustrated embodiment, there are two filter regions. Line 601 depicts which filter region is in the line of sight of the image sensor, as a function of time. At line 602*a*, the first filter region is in the line of sight; at line 602*b*, the second filter region is in the line of sight; at line 602*c*, the first filter region is again in the line of sight; and at line 602*d*, the second filter region is again in the line of sight. Line 603 depicts the angular velocity of the line of sight over time. As can be seen, for most of the time, the line of sight is moving at a constant rate, except for periods of taking a snap shot 604*a*, 604*b*, 604*c*, and 604*d*. During this time, due to the operation of the back-scanning, the effective movement of the line of sight relative to the target is zero. That is, the line of sight appears to remain steady on the target, in order to enable capture of a stable image. The bottom of the figure depicts the filters through which each image is taken. Thus, at time 604*a*, an image 606*a* is taken through the first filter; at time 604*b*, an image 606*b* is taken through the second filter; at time 604*c*, an image 606*c* is taken through the first filter; and at time 604*d*, an image 606*d* is taken through the second filter.

Following capture and mosaicking of the different multispectral images, the images may be processed in a manner known to those of skill in the art. For example, exposure fusion may be applied using two views of an environment taken from different spectral filters, in order to emphasize the contrast between background material and objects of interest. In one application, a leafy target area may be imaged in both the visual spectral band and the near-infrared band with the same image sensor. The reflection of the leaves is much higher in near-infrared than in the visual range. As a result, following an exposure fusion process, the vegetation in a picture may be easily identified and painted a different color, such as purple, enabling easier identification of camouflaged items in the vicinity.

What is claimed is:

1. A multispectral image capture device, comprising:

an imaging platform having arranged thereon an image sensor comprising a photosensitive surface and an optical unit, a gimbals system for controlling line of sight of the image sensor, a filter wheel comprising a series of n spectral filters arranged between the image sensor and an imaging target; a drive system configured to rotate the filter wheel at a constant velocity so as to bring each of the spectral filters into a line of sight between the image sensor and the imaging target, and a controller adapted to synchronize movement of the imaging platform, image capture rate of the image sensor, control of the line of sight of the image sensor with the gimbals, and constant rotation of the filter wheel, such that the image sensor captures a sequence of overlapping step-and-stare images through the series of rotating spectral filters without changing a speed of rotation of the filter wheel, wherein a percentage of overlap between two adjacent step-and-stare images is at least 100*(n−1)/n.

2. The multispectral image capture device of claim 1, wherein the controller is configured to capture a single image each time a spectral filter passes through a line of sight between the imaging target and the image sensor.

3. The multispectral image capture device of claim 1, wherein the filter wheel further comprises at least one additional spectral filter of a smaller dimension than the each of the series of n spectral filters, and wherein the controller is configured to freeze the rotation of the filter wheel when capturing the step-and-stare images via the at least one additional spectral filter.

4. The multispectral image capture device of claim 3, wherein the at least one additional filter allows a combination of all spectral bands allowed by the n spectral filters.

5. The multispectral image capture device of claim 1, wherein the device further comprises a fast steering mirror, and the controller is configured to advance the spectral filters relative to the image sensor, and to capture step-and-stare images, when using the fast steering mirror for back scanning in order to freeze the line of sight relative to the ground for each captured frame.

6. The multispectral image capture device of claim 1, wherein the image capture rate is at least 30 frames per second.

7. A method of multispectral step-and-stare imaging, comprising:

advancing an imaging platform relative to an imaging target, wherein the imaging platform has arranged thereon an image sensor comprising a photosensitive surface, a gimbals system for controlling a line of sight of the image sensor, and a filter wheel comprising a series of n rotating spectral filters and arranged between the image sensor and the imaging target; rotating the filter wheel at a constant velocity so as to bring each of the spectral filters into a line of sight between the image sensor and the imaging target, and synchronizing straight line movement of the platform, image capture rate of the image sensor, control of the line of sight of the image sensor, and rotation of the filter wheel, such that the image sensor captures a sequence of overlapping step-and-stare images through the series of rotating spectral filters without changing a speed of rotation of the filter wheel, wherein a percentage of overlap between two adjacent step-and-stare images is at least 100*(n−1)/n.

8. The method of claim 7, further comprising capturing a single image each time a spectral filter passes through a line of sight between the imaging target and the image sensor.

9. The method of claim 7, wherein the filter wheel further comprises at least one additional spectral filter of a smaller dimension than the each of the series of n spectral filters, and the method further comprises freezing the rotation when capturing the step-and-stare images via the at least one additional spectral filter.

10. The method of claim 9, wherein the at least one additional spectral filter allows a combination of all light allowed by the n rotating spectral filters.

11. The method of claim 7, wherein the spectral filters permit passage of light in the visible and infrared ranges.

12. The method of claim 7, wherein the imaging platform comprises a fast steering mirror, and the method further comprises advancing the spectral filters relative to the image sensor, capturing step-and-stare images, while using the fast steering mirror for back scanning in order to freeze the line of sight relative to the ground for each captured frame.

13. The method of claim 7, wherein the image capture rate is at least 30 frames per second.

14. The method of claim 7, further comprising stitching images captured through each respective filter, so as to form a photomosaic of the imaging target for each spectral band.

15. The method of claim 7, further comprising performing exposure fusion on images of the imaging target captured through different spectral bands.

16. The multispectral image capture device of claim 1, wherein images captured through each respective spectral filter cover the entire imaging target so as to allow stitching to form a complete photomosaic of the imaging target for each spectral band.

17. The multispectral image capture device of claim 1, wherein the controller controls the line of sight of the image sensor such that stepping of the line of sight between successive step-and-stare images occurs n times per revolution of the filter wheel.

* * * * *